US011925280B2

(12) United States Patent
Brenner

(10) Patent No.: US 11,925,280 B2
(45) Date of Patent: Mar. 12, 2024

(54) PRODUCT HOLDER SYSTEM HAVING SIGN RETAINER

(71) Applicant: iSee Store Innovations, L.L.C., St. Louis, MO (US)

(72) Inventor: Steven Allen Brenner, St. Louis, MO (US)

(73) Assignee: ISEE STORE INNOVATIONS, LLC, St. Louis, MO (US)

( * ) Notice: Subject to any disclaimer, the term of this patent is extended or adjusted under 35 U.S.C. 154(b) by 42 days.

(21) Appl. No.: 17/869,876

(22) Filed: Jul. 21, 2022

(65) Prior Publication Data

US 2024/0023729 A1 Jan. 25, 2024

(51) Int. Cl.

*A47F 5/08* (2006.01)
*G09F 7/18* (2006.01)
*G09F 23/06* (2006.01)

(52) U.S. Cl.

CPC .............. *A47F 5/0884* (2013.01); *G09F 7/18* (2013.01); *G09F 23/06* (2013.01)

(58) Field of Classification Search

CPC ... G09F 7/18; G09F 23/06; G09F 7/12; G09F 2007/122; A47F 5/0884; A47F 2005/0075; A47F 5/08; A47F 7/283

USPC .......... 211/89.01, 75, 88.01, 87.01, 119.003; 248/683, 205.5, 206.3, 206.4; 40/649, 40/611.06, 606.07

See application file for complete search history.

(56) References Cited

U.S. PATENT DOCUMENTS

| | | | | | |
|---|---|---|---|---|---|
| 1,840,763 | A * | 1/1932 | Benchley | G09F 3/08 D19/91 |
| 3,237,327 | A * | 3/1966 | Griggs | G09F 3/18 211/DIG. 1 |
| 3,650,055 | A * | 3/1972 | Bult, III | G09F 7/00 40/907 |
| 3,914,890 | A * | 10/1975 | Behlen, Jr. | G09F 7/02 40/611.05 |
| 3,936,967 | A * | 2/1976 | Davis | B60Q 7/005 428/31 |
| 4,099,813 | A * | 7/1978 | Olivan | B60R 7/04 211/88.01 |
| 4,560,072 | A * | 12/1985 | Burrell | A47F 5/00 211/75 |
| 4,936,470 | A * | 6/1990 | Prindle | A47J 47/16 D7/637 |
| 4,984,693 | A * | 1/1991 | Belokin, Jr. | A47F 5/0876 D6/567 |
| 5,096,272 | A * | 3/1992 | Belokin, Jr. | A47F 7/146 211/90.01 |

(Continued)

*Primary Examiner* — Jennifer E. Novosad

(74) *Attorney, Agent, or Firm* — Joseph M. Butscher; The Small PAtent Law Group LLC

(57) ABSTRACT

A product holder system includes a bracket including a front wall. A rear panel is coupled to the bracket. One or more product holders are coupled to the bracket. The one or more product holders are configured to retain one or more products. One or more securing assemblies are configured to secure the product holder system to a surface of a component. A sign retainer is defined between the front wall and the rear panel. The sign retainer includes a retaining channel having an open top. The sign retainer is configured to retain a sign within the retaining channel. The sign is configured to be inserted into and removed from the retaining channel through the open top.

20 Claims, 4 Drawing Sheets

(56) References Cited

U.S. PATENT DOCUMENTS

| | | | | | |
|---|---|---|---|---|---|
| 5,105,567 | A * | 4/1992 | Real | G09F 7/10 | 40/776 |
| D336,197 | S * | 6/1993 | Wilcox | D19/86 | |
| 5,241,768 | A * | 9/1993 | Thompson | G09F 3/203 | 40/661 |
| 5,330,261 | A * | 7/1994 | Bennett | A47F 3/0486 | 40/597 |
| 5,351,841 | A * | 10/1994 | Belokin | G09F 23/00 | 248/206.3 |
| 5,713,146 | A * | 2/1998 | Reeves, Sr. | G09F 7/10 | 40/722 |
| 6,053,585 | A * | 4/2000 | Osen | E06B 5/006 | 40/606.08 |
| RE36,827 | E * | 8/2000 | Belokin | A47B 73/008 | 211/75 |
| 6,347,471 | B1 * | 2/2002 | Mirza | G09F 15/0025 | 40/594 |
| 6,374,523 | B1 * | 4/2002 | Smith | G09F 7/02 | 40/594 |
| 6,446,375 | B1 * | 9/2002 | Davis | G09F 3/203 | 40/591 |
| 6,718,667 | B2 * | 4/2004 | Applebee | G09F 21/04 | 40/488 |
| 7,028,962 | B1 * | 4/2006 | Hostetler | B63B 17/00 | 248/205.9 |
| 7,080,744 | B2 * | 7/2006 | Robertson | A47F 7/283 | 211/74 |
| 7,114,623 | B2 * | 10/2006 | Robinson | A47F 7/0021 | 40/606.03 |
| 7,556,159 | B2 * | 7/2009 | Robertson | A47B 96/02 | 211/75 |
| 7,584,862 | B2 * | 9/2009 | Robertson | F25D 23/04 | 211/75 |
| 7,975,858 | B2 * | 7/2011 | Schneider | A47F 5/0043 | 211/75 |
| 9,526,356 | B2 * | 12/2016 | Pichel | A47F 5/0043 | |
| 10,104,986 | B2 * | 10/2018 | Schaefer | A47B 73/008 | |
| 10,244,873 | B2 * | 4/2019 | Brenner | A47F 3/0434 | |
| 10,393,168 | B2 | 8/2019 | Schaefer | | |
| 10,477,987 | B2 * | 11/2019 | White | A47F 5/0807 | |
| 10,912,401 | B2 * | 2/2021 | Brenner | A47F 7/283 | |
| 2003/0160060 | A1 * | 8/2003 | Hornblad | A47F 5/08 | 221/256 |
| 2003/0222037 | A1 * | 12/2003 | Belokin | G09F 7/18 | 211/75 |
| 2004/0055981 | A1 * | 3/2004 | Walsh | A47F 7/28 | 211/75 |
| 2006/0060549 | A1 * | 3/2006 | Robertson | A47F 3/0486 | 211/75 |
| 2006/0230657 | A1 * | 10/2006 | Kotze | G09F 11/00 | 40/454 |
| 2009/0217561 | A1 * | 9/2009 | Thompson | G09F 7/22 | 40/606.12 |
| 2023/0276945 | A1 * | 9/2023 | Mueller | A47B 96/066 | 211/88.01 |

* cited by examiner

PRODUCT HOLDER SYSTEM HAVING SIGN RETAINER

FIELD OF THE DISCLOSURE

Examples of the present disclosure generally relate to product holder systems, and more particularly to product holder systems having sign retainers.

BACKGROUND OF THE DISCLOSURE

Various commercial enterprises offer goods for sale that may be contained within a transparent container. For example, various convenience stores offer refreshments for sale. Some of the refreshments, such as soft drinks, alcoholic beverages, and the like, are refrigerated. Often, the refreshments are contained within a refrigerated compartment having a transparent door (formed of, for example, glass). The transparent door allows a customer to see the types of soft drinks that are available for sale. If the customer chooses to purchase a particular soft drink, the customer opens the door, removes a soft drink within the refrigerated compartment, and then closes the door.

The space within a refrigerated compartment is limited. As such, each refrigerated compartment is able to contain a limited number of products. A known refrigerated compartment includes multiple shelves on which various products are positioned. When the shelf space is fully occupied by product, additional products are not able to be positioned within the refrigerated compartment. Instead, as products within the refrigerated compartment are removed by customers, additional product may then be moved into the open space on the shelf.

As can be appreciated, the additional product that is not within the refrigerated compartment is stored at other areas of an establishment, thereby taking up valuable space. Further, if a large number of products are removed from the refrigerated compartment, the additional products that are used to replenish the refrigerated compartment take time to cool to a desirable temperature.

Additionally, many establishments have a large number of refrigerated compartments that contain products. With increased numbers of refrigerator compartments, doors, and rows, shelves, and the like, retailers and suppliers may find it difficult to distinguish their products from the hundreds of other products on display.

U.S. Pat. No. 10,104,986, entitled "Systems and Methods for Securing and Displaying Products," discloses a product holder system configured to be removably secured to a surface of a component. A known product holder system can have a sign secured thereto. However, in order to change the sign, product is typically first unloaded therefrom, and the product holder system is then removed from a component (such as a door of a refrigerated compartment). A sign is then secured to the product holder system. After the sign is attached, the product holder system is then secured to the component, and product can be re-inserted.

As can be appreciated, the process of removing product from the product holder system, removing the product holder system from the component, attaching a sign, attaching the product holder system, and re-inserting product typically takes time and effort. For example, such process typically can take 3 minutes or longer.

SUMMARY OF THE DISCLOSURE

A need exists for a product holder system and method that is configured for quick, easy, effective, and efficient securing of a sign thereto.

With those needs in mind, certain examples of the present disclosure provide a product holder system including a bracket including a front wall. A rear panel is coupled to the front wall of the bracket. One or more product holders are coupled to the bracket. The one or more product holders are configured to retain one or more products. One or more securing assemblies are configured to secure the bracket to a surface of a component. A sign retainer is defined between the front wall and the rear panel. The sign retainer includes a retaining channel having an open top. The sign retainer is configured to removably retain a sign within the retaining channel. The sign is configured to be inserted into and removed from the retaining channel through the open top.

In at least one example, the sign retainer is configured to allow the sign to be inserted to and removed from the retaining channel without the product holder system being removed from the surface of the component.

In at least one example, the one or more securing assemblies include a suction cup.

In at least one example, the retaining channel is defined between a rear surface of the front wall, lateral edges of one or both of the front wall or the rear panel, a lower base edge of one or both of the front wall or the rear panel, and a front surface of the rear panel.

In at least one example, the rear panel is removable from the front wall.

In at least one example, the front wall includes one or more downwardly curved upper surfaces configured to expose at least a portion of an upper edge of the sign when the sign is retained by the sign retainer.

The bracket can be transparent. The rear panel can be transparent. In at least one example, the bracket, the rear panel, and the one or more product holders are transparent.

Certain examples of the present disclosure provide a method including coupling one or more product holders coupled to a bracket including a front wall, wherein the one or more product holders are configured to retain one or more products; securing, by one or more securing assemblies, the bracket to a surface of a component; and removably retaining, by a sign retainer defined between the front wall and a rear panel coupled to the front wall, a sign, wherein the sign retainer includes a retaining channel having an open top, wherein the sign retainer is configured to retain a sign within the retaining channel, and wherein the sign is configured to be inserted into and removed from the retaining channel through the open top.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a product holder system including a bracket or main body, which includes a sign retainer. The sign retainer can be integrally formed with the bracket. As another example, the sign retainer can include a panel coupled to the bracket. The bracket includes recesses, such as crescent shaped openings, along the top that allow an individual to grasp a sign. The sign can be a panel, card, sheet, or the like that is inserted into the sign retainer. The sign can include one or more of graphics, text, or the like. The sign can include information regarding a product, an advertisement, and/or the like. In at least one example, the sign is held in place by a solid clear plastic panel that can also detach from the bracket.

Examples of the present disclosure allow for a sign to be more easily removed when the product holder system is secured to a component, such as a door of a refrigerated compartment. In contrast to a prior known system, examples of the present disclosure allow for quicker insertion, removal, and swapping of signs, as there is no need to remove the product holder system from the component. Further, the product holder systems as described herein provide an aesthetically pleasing clean and neat look.

Figure 1:
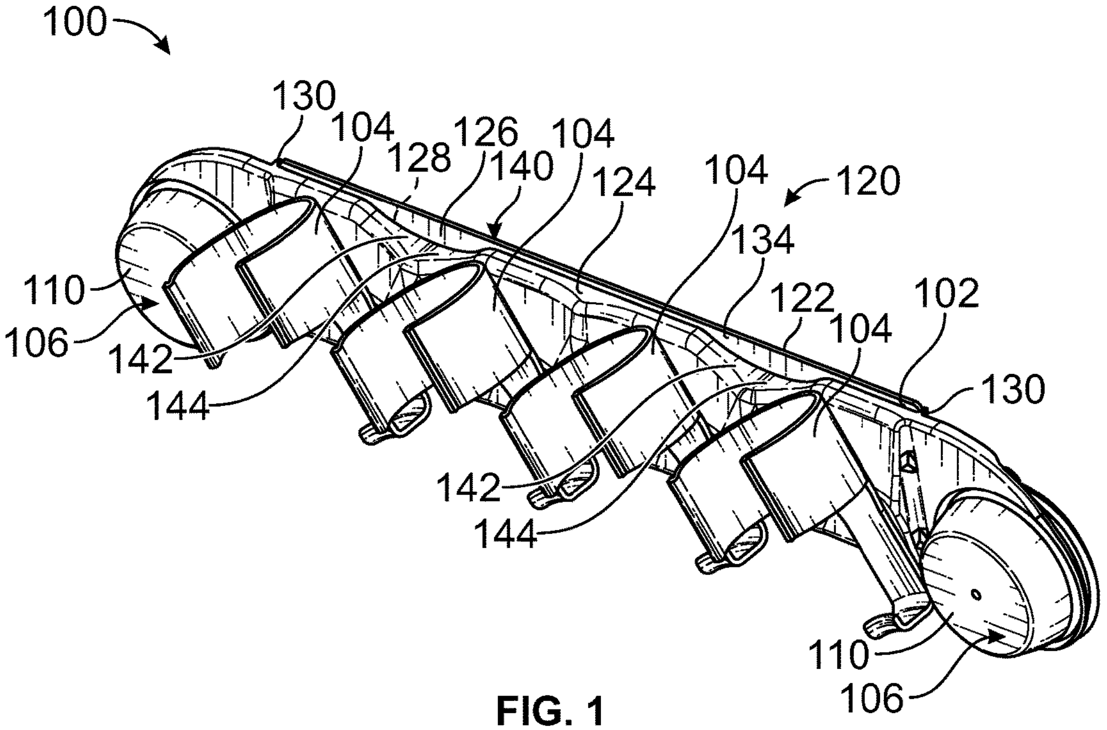
FIG. 1 illustrates an isometric front view of a product holder system, according to an example of the present disclosure.
Figure 2:
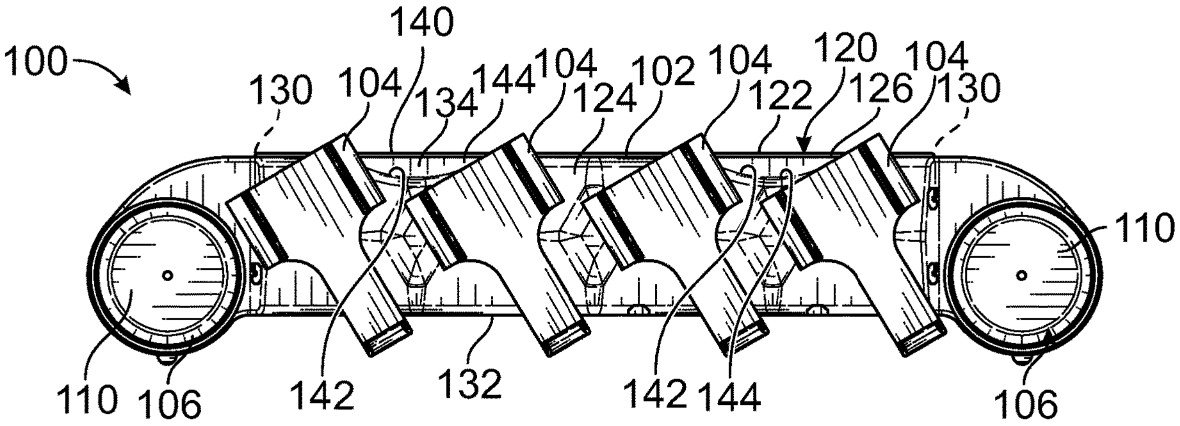
FIG. 2 illustrates a front view of the product holder system.
Figure 3:
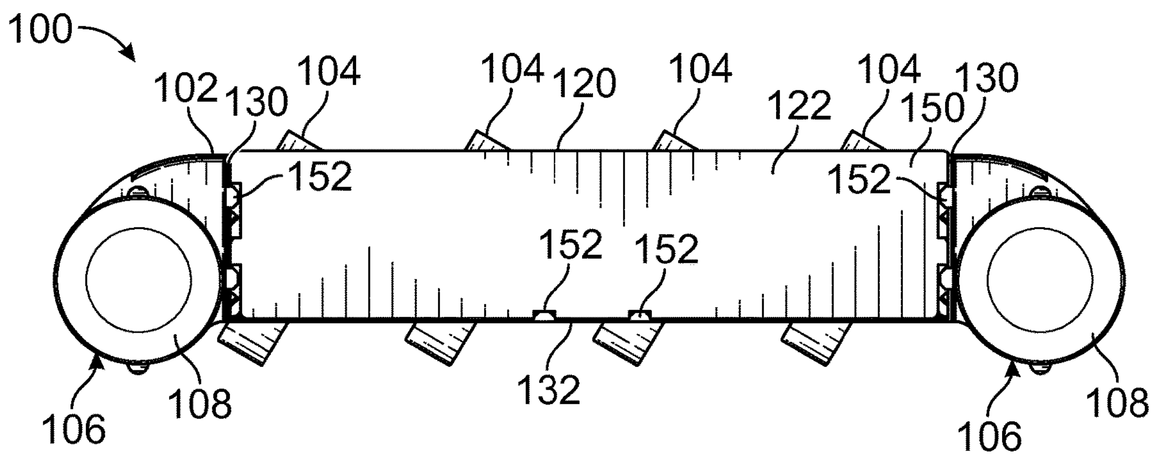
FIG. 3 illustrates a rear view of the product holder system.
Figure 4:
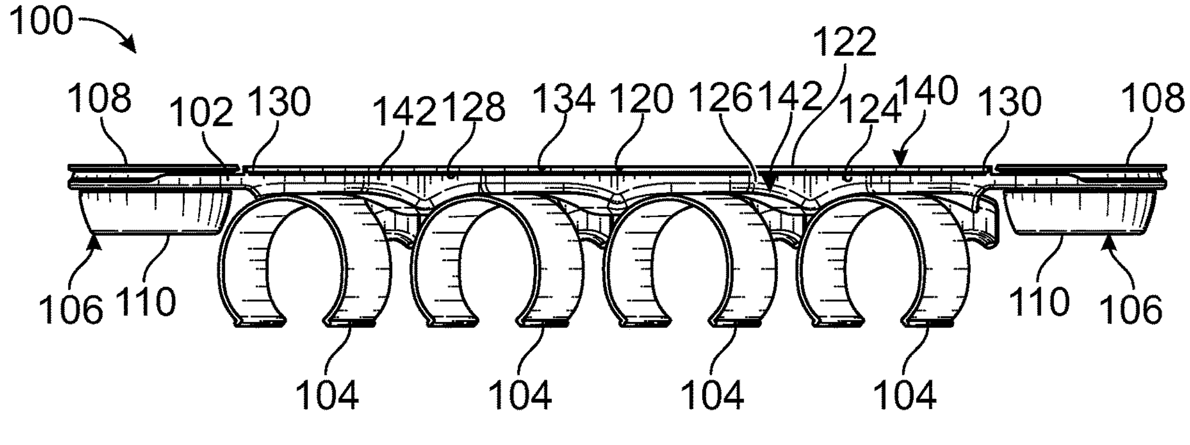
FIG. 4 illustrates a top view of the product holder system.
Figure 5:
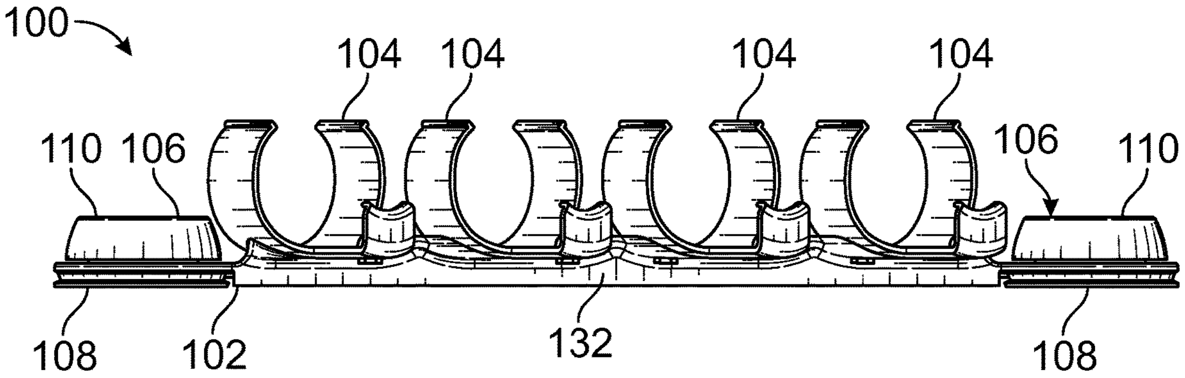
FIG. 5 illustrates a bottom view of the product holder system.
Figure 6:
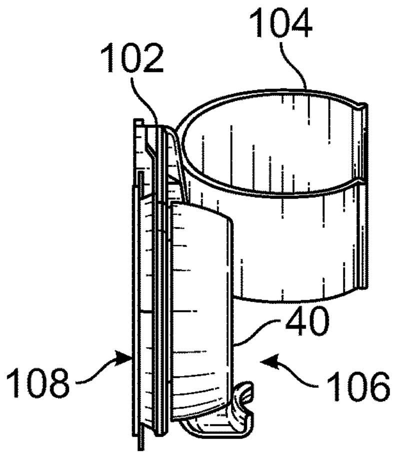
FIG. 6 illustrates a first side view of the product holder system.
Figure 7:
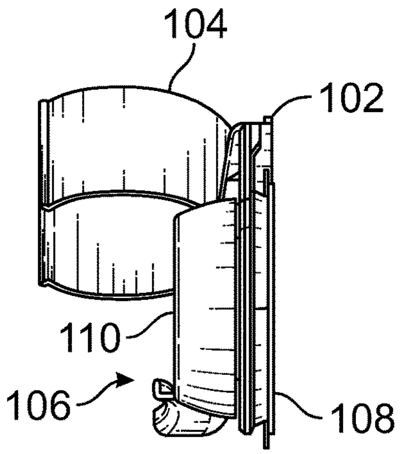
FIG. 7 illustrates a second side view of the product holder system.

FIG. 1 illustrates an isometric front view of a product holder system 100, according to an example of the present disclosure. FIG. 2 illustrates a front view of the product holder system 100. FIG. 3 illustrates a rear view of the product holder system 100. FIG. 4 illustrates a top view of the product holder system 100. FIG. 5 illustrates a bottom view of the product holder system 100. FIG. 6 illustrates a first side (for example, a right side) view of the product holder system 100. FIG. 7 illustrates a second side (for example, a left side) view of the product holder system.

Referring to FIGS. 1-7, the product holder system 100 includes a main body or bracket 102. One or more product holders 104 are removably coupled to the bracket 102. The product holders 104 can be removably coupled to the bracket 102 through fasteners, which can be integrally formed with the product holders 104 or the bracket 102. Optionally, the fasteners can be separate and distinct from the product holders 104 and the bracket 102. One or more securing assemblies 106 are configured to removably secure the product holder system 100 to a surface of a component. For example, the component can be a refrigerated compartment. The surface can be a glass panel, a mirror, wall, or the like.

The product holders 104 can be configured as shown and described in U.S. Pat. No. 10,104,986, entitled "Systems and Methods for Securing and Displaying Products" (the "'986 Patent"), which is hereby incorporated by reference in its entirety. The product holders 104 can be adjustably secured to the bracket 102 as shown and described in the '986 Patent. Optionally, the product holders 104 can be sized and shaped differently than shown. Also, alternatively, the product holders 104 can be permanently fixed to the bracket 102. The product holder system 100 can include more or fewer product holders 104 than shown. For example, the product holder system 100 can include one product holder 104. As another example, the product holder system 100 can include two or three product holders 104. As another example, the product holder system 100 can include five or more product holders 104.

The securing assemblies 106 can include a suction cup 108 that couples to a suction securing nut 110 and securing mounts, which can be integrally formed with the bracket 102, as described in the '986 Patent. Optionally, the securing assemblies 106 can include locking rings, or other such features that separately couple to the bracket 102. As another example, the securing assemblies 106 can be configured as described in U.S. Pat. No. 10,393,168, entitled "Securing Assembly," which is hereby incorporated by reference in its entirety. As another example, the securing assemblies 106 can be suction cups that are permanently secured to the bracket 102. For example, suction cups can extend from portions of the bracket 102. The product holder system 100 can include more or fewer securing assemblies 106 than shown. For example, the product holder system 100 can include a single securing assembly 106. As another example, the product holder system 100 can include three or more securing assemblies 106.

The product holder system 100 also includes a sign retainer 120. The sign retainer 120 can be integrally formed with the bracket 102. Optionally, the sign retainer 120 can be removably coupled to the bracket 102. The sign retainer 120 includes a rear panel 122 secured to a front wall 124 of the bracket 102. The sign retainer 120 further includes a retaining channel 126 defined between a rear surface 128 of the front wall 124, lateral edges 130 of the front wall 124, a lower base edge 132 of the front wall 124, and a front surface 134 of the rear panel 122. The sign retainer 120 further includes an open top 140 that leads into the retaining channel 126. For example, the retaining channel 126 includes the open top 140. Optionally, the rear panel 122 can include the lateral edges 130, and the lower base edge 132.

As shown, the bracket 102 includes upper recessed areas 142. The upper recessed areas 142 expose upper portions of the rear panel 122. The upper recessed areas 142 are defined by downwardly curved upper surfaces 144 of the front wall 124. The downwardly curved upper surfaces downwardly bow toward the lower base edge 132. For example, the downwardly curved upper surfaces 144 can be semi-circular. The downwardly curved upper surfaces 144 can be half-moon or crescent-moon shaped, for example. The upper recessed areas 142 provide clearance spaces that expose portions of a sign inserted into the sign retainer 120. As such, an individual can quickly and easily grasp the sign to remove the sign from the sign retainer 120. The bracket 102 can have more or fewer upper recessed areas 142 than shown. For example, the bracket 102 can include a single upper recessed area 142. As another example, the bracket 102 can include three or more upper recessed areas 142. In at least one other example, the bracket 102 may not include any upper recessed areas.

In at least one example, the bracket 102, the product holders 104, and the rear panel 122 are formed of a clear, transparent material, such as a clear, transparent plastic. As such, a sign inserted into the sign retainer 120 is visible through the bracket 102, the product holders 104, and the rear panel 122. The sign can have information (including graphics, text, and the like) on a front surface that is visible through the bracket 102 and the product holders 104, and a rear surface that is visible through the rear panel 122.

A rear surface 150 of the rear panel 122 can be flat. In at least one example, the rear surface 150 is configured to reside in a plane that is parallel to a plane of the surface to which the product holder system 100 secures. The rear surface 150 can be spaced apart from the surface of the component to which the product holder system 100 secures. For example, the suction cups 108 that removably secure the product holder system 100 to the surface space the rear panel 122 from the surface. Optionally, the rear panel 122 can abut against the surface.

As shown in FIG. 3, the rear panel 122 can be removably secured to the bracket 102 through one or more tabs 152. For example, the rear panel 122 can be slid down into position onto the bracket 102 in the direction of arrow A, and the tabs 152 of the bracket 102 secure the rear panel 122 in place (along with the lateral edges 130 and lower base edge 130. As such, the rear panel 122 can be removable from the bracket 102. In at least one other example, the rear panel 122 is integrally formed with the bracket 102. For example, the bracket 102 can be integrally formed and molded to include the rear panel 122, which can be permanently secured to the front wall 124.

Figure 8:
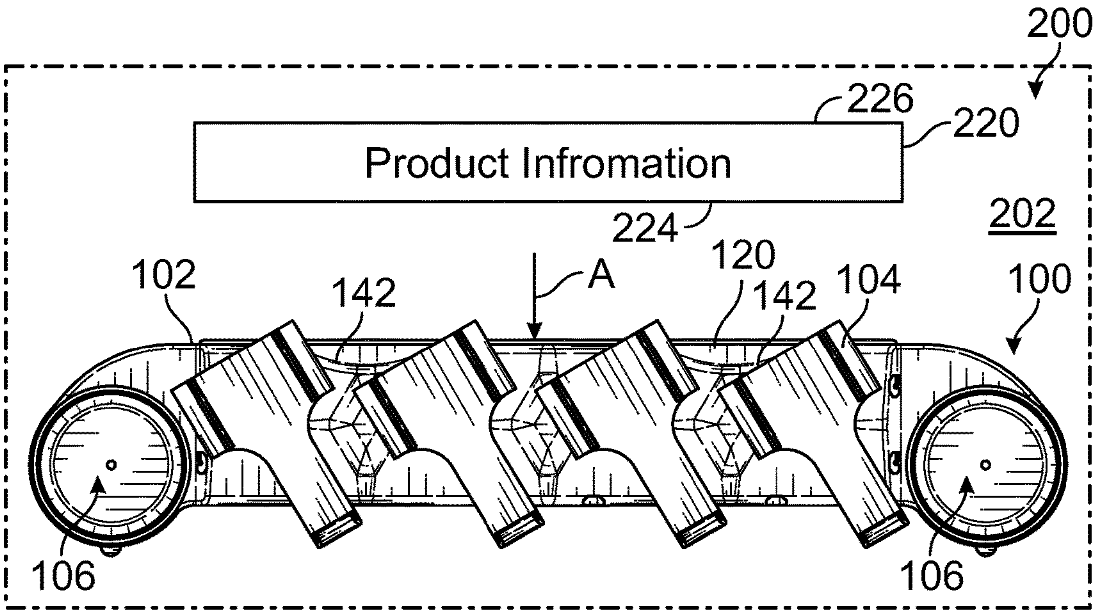
FIG. 8 illustrates a front view of the product holder system secured to a component.

FIG. 8 illustrates a front view of the product holder system 100 secured to a component 200. The component 200 can be a refrigerated compartment, a door, a wall, or the like. The product holder system 100 secures to a surface 202 of the component 200. For example, the surface 202 can be an exterior or interior surface of the component 200. The surface 202 can be glass, a mirror, a plastic wall, or the like.

The sign retainer 120 is configured to retain a sign 220, such as can include product information for products held by the product holders 104. The sign 220 can be a panel, card, sheet, or the like that includes product information, such as in the form of graphic, text, and/or the like. Optionally, the sign 220 can include information that is not related to product held by the product holder system 100. That is, the sign can include product information, information not related to the product, and/or the like. The information on the sign can be visible through the bracket 102, as explained above. Optionally, the sign 220 can be sized and shaped to have a portion that extends upwardly from the product retainer 120. In this example, the bracket 102 may not be transparent, and the product information can extend above the bracket 102.

Referring to FIGS. 1-8, the product holder system 100 including the sign retainer 120 is configured to allow for insertion and removal of the sign 220 through an open top of the sign retainer 120. In order to secure the sign 220 to the product holder system 100, the sign 220 is positioned above the sign retainer 120. A lower edge 224 of the sign is aligned with the open top 140 of the sign retainer 120. The lower edge 224 is then urged into the open top 140, which allows the sign 220 to drop into the retaining channel 126, and be retained therein. Once the sign 220 is secured within the sign retainer 120, portions of an upper edge 226 of the sign 220 are exposed by the upper recessed areas 142. As such, the portions of the upper edge 226 can be quickly and easily grasped to remove the sign 220 from the sign retainer 120. Accordingly, signs can be quickly and easily inserted into and removed from the product holder system 100 without the product holder system 100 being removed from the surface 202 of the component 200.

Figure 9:
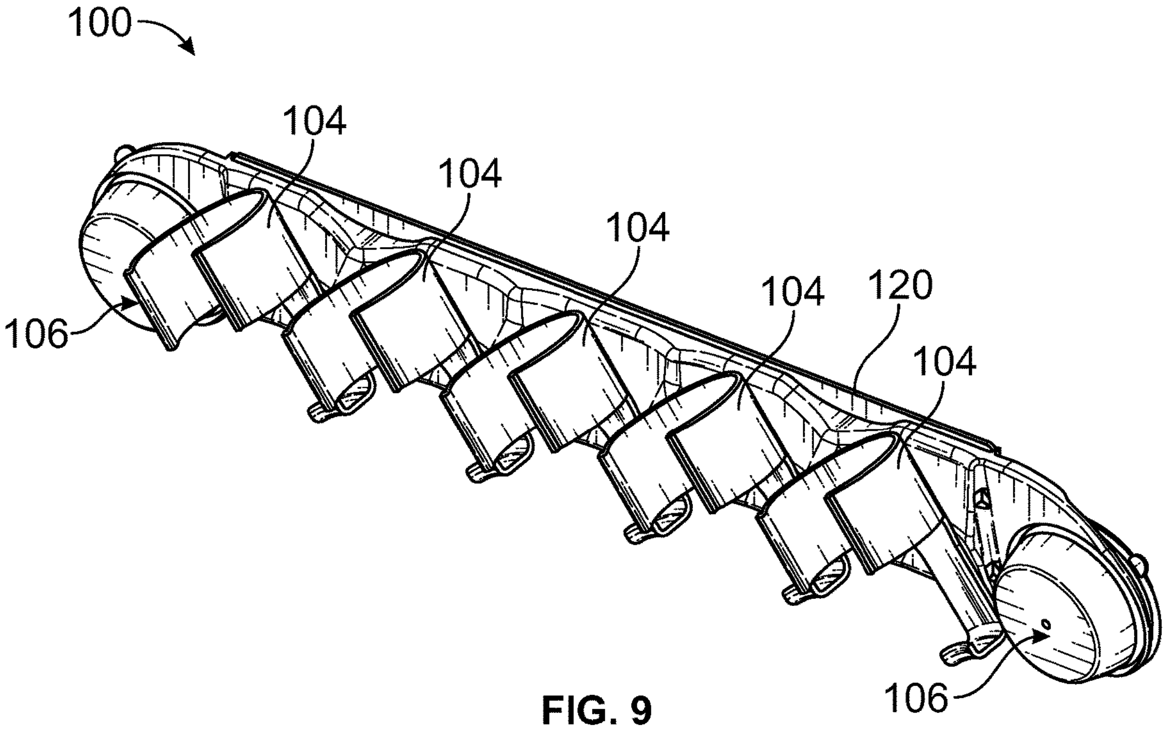
FIG. 9 illustrates an isometric front view of a product holder system, according to an example of the present disclosure.

FIG. 9 illustrates an isometric front view of a product holder system 100, according to an example of the present disclosure. As shown in FIG. 9, the product holder system 100 can include five product holders 104. As noted, the product holder system 100 can include more or fewer product holders 104 than shown.

Referring to FIGS. 1-9, the product holder system 100 includes the bracket 102 having the front wall 124. The rear panel 122 is coupled to the bracket 102. One or more product holders 104 are coupled to the bracket 102. The one or more product holders 104 are configured to retain one or more products. One or more securing assemblies 106 are configured to secure the bracket 102 to the surface 202 of the component 200. The sign retainer 120 is defined between the front wall 124 of the bracket 102 and the rear panel 122. The sign retainer 120 includes the retaining channel 126 having the open top 140. The sign retainer 120 is configured to removably retain (for example, retain and allow for removal) the sign 220 within the retaining channel 126. The sign 220 is configured to be inserted into and removed from the retaining channel 126 through the open top 140.

The product holder systems 100 described herein allow for signs to be easily removed when the product holder systems 100 are secured to a component, such as a door of a refrigerated compartment. In contrast to a prior known system, examples of the present disclosure allow for quicker insertion, removal, and swapping of signs, as there is no need to remove the product holder systems 100 from components. Further, the product holder systems 100 as described herein provide an aesthetically pleasing clean and neat look, as shown in the Figures.

Further, the disclosure comprises examples according to the following clauses:

Clause 1. A product holder system, comprising:

a bracket including a front wall;

a rear panel coupled to the front wall of the bracket;

one or more product holders coupled to the bracket, wherein the one or more product holders are configured to retain one or more products;

one or more securing assemblies configured to secure the bracket to a surface of a component; and a sign retainer defined between the front wall and the rear panel, wherein the sign retainer includes a retaining channel having an open top, wherein the sign retainer is configured to removably retain a sign within the retaining channel, and wherein the sign is configured to be inserted into and removed from the retaining channel through the open top.

Clause 2. The product holder system of Clause 1, wherein the sign retainer is configured to allow the sign to be inserted to and removed from the retaining channel without the product holder system being removed from the surface of the component.

Clause 3. The product holder system of Clauses 1 or 2, wherein the one or more securing assemblies comprise a suction cup.

Clause 4. The product holder system of any of Clauses 1-3, wherein the retaining channel is defined between a rear surface of the front wall, lateral edges of one or both of the front wall or the rear panel, a lower base edge of one or both of the front wall or the rear panel, and a front surface of the rear panel.

Clause 5. The product holder system of any of Clauses 1-4, wherein the rear panel is removable from the front wall.

Clause 6. The product holder system of any of Clauses 1-5, wherein the front wall comprises one or more downwardly curved upper surfaces configured to expose at least a portion of an upper edge of the sign when the sign is retained by the sign retainer.

Clause 7. The product holder system of any of Clauses 1-6, wherein the bracket is transparent.

Clause 8. The product holder system of any of Clauses 1-6, wherein the rear panel is transparent.

Clause 9. The product holder system of any of Clauses 1-8, wherein the bracket, the rear panel, and the one or more product holders are transparent.

Clause 10. A method, comprising:

coupling one or more product holders coupled to a bracket including a front wall, wherein the one or more product holders are configured to retain one or more products;

securing, by one or more securing assemblies, the bracket to a surface of a component; and removably retaining, by a sign retainer defined between the front wall and a rear panel coupled to the front wall, a sign, wherein the sign retainer includes a retaining channel having an open top, wherein the sign retainer is configured to retain a sign within the retaining channel, and wherein the sign is configured to be inserted into and removed from the retaining channel through the open top.

Clause 11. The method of Clause 10, wherein said removably retaining comprises inserting and removing the sign with respect to the retaining channel without the bracket being removed from the surface of the component.

Clause 12. The method of Clauses 10 or 11, wherein the one or more securing assemblies comprise a suction cup.

Clause 13. The method of any of Clauses 10-12, wherein the retaining channel is defined between a rear surface of the front wall, lateral edges of one or both of the front wall or the rear panel, a lower base edge of one or both of the front wall or the rear panel, and a front surface of the rear panel.

Clause 14. The method of any of Clauses 10-13, further comprising removing the rear panel from the front wall.

Clause 15. The method of any of Clauses 10-14, further comprising exposing, through one or more downwardly curved upper surfaces of the front wall, at least a portion of an upper edge of the sign when the sign is retained by the sign retainer.

Clause 16. The method of any of Clauses 10-15, wherein the bracket is transparent.

Clause 17. The method of any of Clauses 10-15, wherein the rear panel is transparent.

Clause 18. The method of any of Clauses 10-15, wherein the bracket, the rear panel, and the one or more product holders are transparent.

Clause 19. A product holder system, comprising:

a bracket including a front wall, wherein the front wall is transparent, and wherein the front wall comprises downwardly curved upper surfaces;

a rear panel coupled to the front wall of the bracket, wherein the rear panel is transparent;

product holders coupled to the bracket, wherein the product holders are transparent, and wherein each of the product holders is configured to retain a product;

securing assemblies configured to secure the bracket to a surface of a component, wherein each of the securing assemblies comprises a suction cup; and a sign retainer defined between the front wall and the rear panel, wherein the sign retainer includes a retaining channel having an open top, wherein the sign retainer is configured to removably retain a sign within the retaining channel, wherein the sign is configured to be inserted into and removed from the retaining channel through the open top, wherein downwardly curved upper surfaces are configured to expose at least a portion of an upper edge of the sign when the sign is retained by the sign retainer, and wherein the sign retainer is configured to allow the sign to be inserted to and removed from the retaining channel without the product holder system being removed from the surface of the component.

Clause 20. The product holder system of Clause 19, wherein the retaining channel is defined between a rear surface of the front wall, lateral edges of one or both of the front wall or the rear panel, a lower base edge of one or both of the front wall or the rear panel, and a front surface of the rear panel.

As described herein, examples of the present disclosure provide product holder systems and methods that are configured for quick, easy, effective, and efficient securing of a sign thereto.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A product holder system, comprising:
a bracket including a front wall;
a rear panel coupled to the front wall of the bracket;
product holders removably coupled to the bracket, wherein each of the product holders is configured to removably retain a product;
one or more securing assemblies configured to secure the bracket to a surface of a component; and
a sign retainer defined between the front wall and the rear panel, wherein the sign retainer includes a retaining channel having an open top, wherein the sign retainer is configured to removably retain a sign within the retaining channel, and wherein the sign is configured to be inserted into and removed from the retaining channel through the open top.

2. The product holder system of claim 1, wherein the sign retainer is configured to allow the sign to be inserted to and removed from the retaining channel without the product holder system being removed from the surface of the component.

3. The product holder system of claim 1, wherein the one or more securing assemblies comprise a suction cup.

4. The product holder system of claim 1, wherein the retaining channel is defined between a rear surface of the front wall, lateral edges of one or both of the front wall or the rear panel, a lower base edge of one or both of the front wall or the rear panel, and a front surface of the rear panel.

5. The product holder system of claim 1, wherein the rear panel is removable from the front wall.

6. The product holder system of claim 1, wherein the front wall comprises one or more downwardly curved upper surfaces configured to expose at least a portion of an upper edge of the sign when the sign is retained by the sign retainer.

7. The product holder system of claim 1, wherein the bracket is transparent.

8. The product holder system of claim 1, wherein the rear panel is transparent.

9. The product holder system of claim 1, wherein the bracket, the rear panel, and the one or more product holders are transparent.

10. A method, comprising:
removably coupling product holders to a bracket including a front wall, wherein each of the product holders is configured to removably retain a product;
securing, by one or more securing assemblies, the bracket to a surface of a component; and
removably retaining, by a sign retainer defined between the front wall and a rear panel coupled to the front wall, a sign,
wherein the sign retainer includes a retaining channel having an open top, wherein the sign retainer is configured to retain the sign within the retaining channel, and wherein the sign is configured to be inserted into and removed from the retaining channel through the open top.

11. The method of claim 10, wherein said removably retaining comprises inserting and removing the sign with respect to the retaining channel without the bracket being removed from the surface of the component.

12. The method of claim 10, wherein the one or more securing assemblies comprise a suction cup.

13. The method of claim 10, wherein the retaining channel is defined between a rear surface of the front wall, lateral edges of one or both of the front wall or the rear panel, a lower base edge of one or both of the front wall or the rear panel, and a front surface of the rear panel.

14. The method of claim 10, further comprising removing the rear panel from the front wall.

15. The method of claim 10, further comprising exposing, through one or more downwardly curved upper surfaces of the front wall, at least a portion of an upper edge of the sign when the sign is retained by the sign retainer.

16. The method of claim 10, wherein the bracket is transparent.

17. The method of claim 10, wherein the rear panel is transparent.

18. The method of claim 10, wherein the bracket, the rear panel, and the one or more product holders are transparent.

19. A product holder system, comprising:
a bracket including a front wall, wherein the front wall is transparent, and wherein the front wall comprises downwardly curved upper surfaces;
a rear panel coupled to the front wall of the bracket, wherein the rear panel is transparent;
product holders removably coupled to the bracket, wherein the product holders are transparent, and wherein each of the product holders is configured to removably retain a product;
securing assemblies configured to secure the bracket to a surface of a component, wherein each of the securing assemblies comprises a suction cup; and
a sign retainer defined between the front wall and the rear panel, wherein the sign retainer includes a retaining channel having an open top, wherein the sign retainer is configured to removably retain a sign within the retaining channel, wherein the sign is configured to be inserted into and removed from the retaining channel through the open top, wherein the downwardly curved upper surfaces are configured to expose at least a portion of an upper edge of the sign when the sign is retained by the sign retainer, and wherein the sign retainer is configured to allow the sign to be inserted to and removed from the retaining channel without the product holder system being removed from the surface of the component.

20. The product holder system of claim 19, wherein the retaining channel is defined between a rear surface of the front wall, lateral edges of one or both of the front wall or the rear panel, a lower base edge of one or both of the front wall or the rear panel, and a front surface of the rear panel.

* * * * *